United States Patent
Klein et al.

(12) 
(10) Patent No.: US 6,202,036 B1
(45) Date of Patent: *Mar. 13, 2001

(54) END-TO-END RESPONSE TIME MEASUREMENT FOR COMPUTER PROGRAMS USING STARTING AND ENDING QUEUES

(75) Inventors: Paul F. Klein, Thousand Oaks, CA (US); Raymond P. Ammerman, III, Raleigh, NC (US)

(73) Assignee: Candle Distributed Solutions, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/428,271

(22) Filed: Oct. 27, 1999

Related U.S. Application Data

(63) Continuation of application No. 08/899,195, filed on Jul. 23, 1997, now Pat. No. 5,991,705.

(51) Int. Cl.[7] .............................. G04F 10/00; G06F 13/00
(52) U.S. Cl. .......................... 702/178; 702/178; 702/182; 709/233

(58) Field of Search ..................................... 702/185, 186, 702/176, 178; 714/26, 38, 20; 348/180; 709/233

(56) References Cited

U.S. PATENT DOCUMENTS

| | | | |
|---|---|---|---|
| 4,868,785 | 9/1989 | Jordan et al. | 702/185 |
| 5,068,814 | 11/1991 | Stark et al. | 702/185 |
| 5,483,468 | 1/1996 | Chen et al. | 702/186 |
| 5,506,955 | 4/1996 | Chen et al. | 714/26 |
| 5,511,185 | 4/1996 | Weinbaum et al. | 714/38 |
| 5,519,438 | 5/1996 | Elliott et al. | 348/180 |
| 5,553,235 | 9/1996 | Chen et al. | 714/20 |

FOREIGN PATENT DOCUMENTS 0259224  8/1987  (EP).

Primary Examiner—Kamini Shah
(74) Attorney, Agent, or Firm—Gates & Cooper LLP

(57) ABSTRACT

An end-to-end response time measurement method monitors the performance of a computer program by measuring the time between related messages that traverse inbound and outbound message queues.

18 Claims, 3 Drawing Sheets

END-TO-END RESPONSE TIME MEASUREMENT FOR COMPUTER PROGRAMS USING STARTING AND ENDING QUEUES

This application is a Continuation of application Ser. No. 08/899,195, filed Jul. 23, 1997 U.S. Pat. No. 5,991,705, entitled END-TO-END RESPONSE TIME MEASUREMENT FOR COMPUTER PROGRAMS USING STARTING AND ENDING QUEUES, which application is incorporated herein by reference.

BACKGROUND OF THE INVENTION

1. Field of the Invention

This invention relates generally to computer hardware and software, and more particularly to an end-to-end response time measurement for computer programs.

2. Description of Related Art

In today's environment, it is common for desktop computers to run many different local and/or network applications simultaneously. Within such computing environments, it is not unusual for one application to execute significantly slower than other applications. Further, it is not uncommon for the operation of one application to seriously impact the performance of other applications on the computer. As a result, the user may have to wait an inordinate amount of time for applications to respond. Obviously, the wait time experienced by a user is directly related to that person's productivity and business opportunity.

It can be difficult for the user to determine the performance of individual applications, based only on their observable behavior. For example, a user may be unable to reliably detect whether abnormal performance for a specific application is the result of operations performed by that application, or whether it is the result of the impact from another application, or whether it is the result of the performance of a remote system. Further, since each application may be able to perform many different kinds of processing, the user may have no idea that certain requests have significantly worse performance. Thus, there is a need in the art for techniques that allow the performance of various applications to be accurately and automatically measured.

SUMMARY OF THE INVENTION

To overcome the limitations in the prior art described above, and to overcome other limitations that will become apparent upon reading and understanding the present specification, the present invention discloses a method, apparatus, and article of manufacture for measuring end-to-end response time for computer programs.

The method comprises the steps of detecting start and end times of a transaction, storing the start and end times in a memory of a computer, and subtracting the start time from the end time to calculate an end-to-end response time.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like numbers represent similar features throughout.

DETAILED DESCRIPTION OF THE PREFERRED EMBODIMENT

In the following description of the preferred embodiment, reference is made to the accompanying drawings which form a part hereof, and in which is shown by way of illustration the specific embodiment in which the invention may be practiced. It is to be understood that other embodiments may be utilized and structural and functional changes may be made without departing from the scope of the present invention.

Hardware Environment

Figure 1:
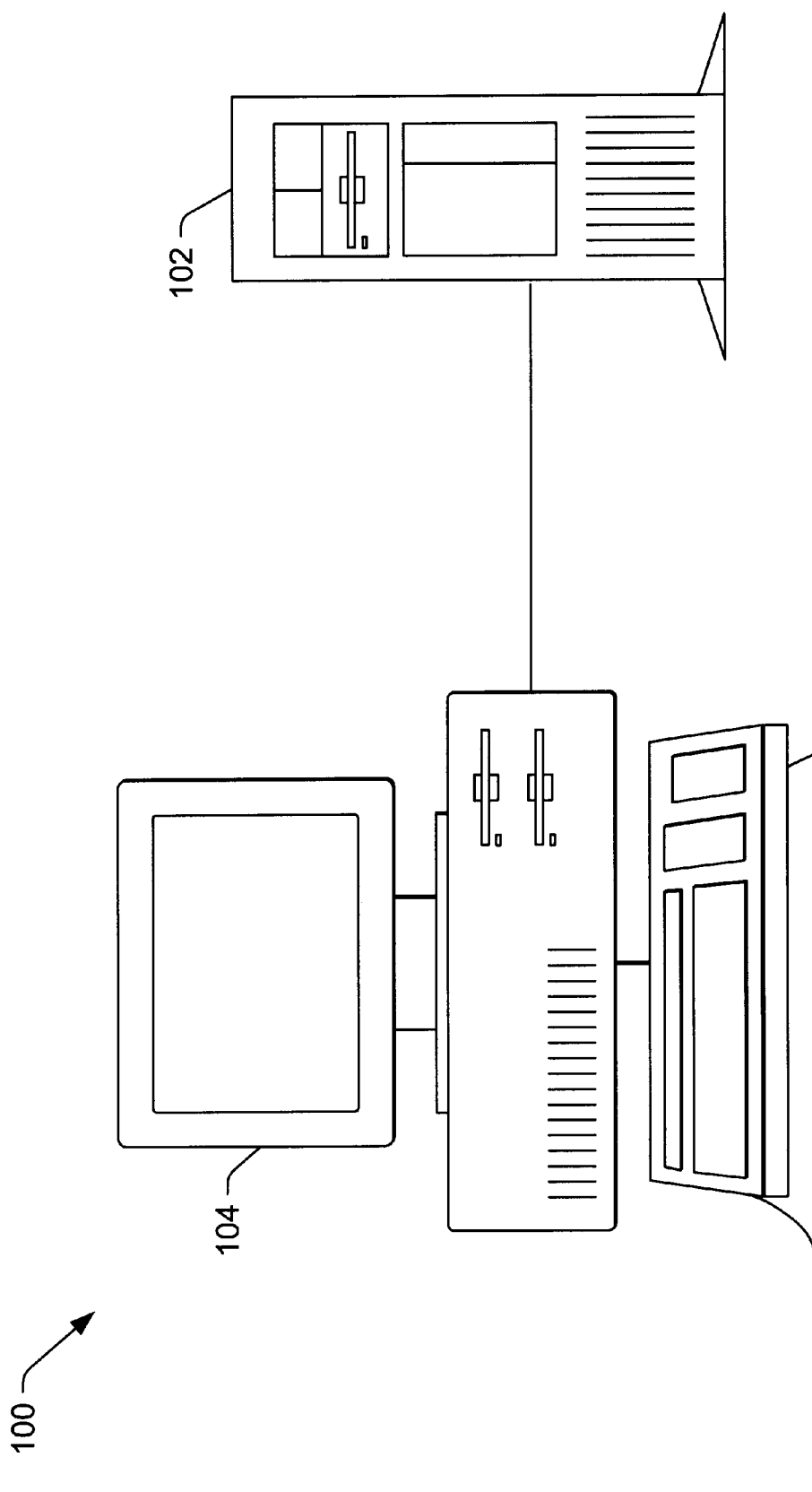
FIG. 1 illustrates an exemplary hardware environment that could be used to implement the preferred embodiment of the present invention.

FIG. 1 illustrates an exemplary hardware environment that could be used to implement the preferred embodiment of the present invention. The exemplary hardware environment may include, inter alia, a client computer 100 and/or a server computer 102 connected to the client 100. Both the client 100 and server 102 generally include, inter alia, a processor, random access memory (RAM), read only memory (ROM), a monitor 104, data storage devices, data communications devices, etc. The client 100 and server 102 may also include data input devices such as a mouse pointing device 106 and a keyboard 108. Of course, those skilled in the art will recognize that any combination of the above components, or any number of different components, peripherals, and other devices, may be used with the client and/or server.

The client 100 and the server 102 each operate under the control of their respective operating systems, such as OS/2™, Windows NT, UNIX, MVS, etc. The respective operating systems of the client 100 and server will also control the operation of any computer programs executed by the client 100 and the server 102.

The present invention comprises a monitoring function that is preferably implemented by one or more computer programs executed by the client 100. Generally, these computer programs are tangibly embodied in or readable from a computer-readable medium or carrier, e.g., one or more of the fixed and/or removable data storage data devices and/or data communications devices attached to the client or the server. These computer programs comprise instructions which, when read and executed by client 100, cause the client 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Monitoring Functions

The computer program that implements the monitoring functions of the present invention (referred to as the "monitor program") uses standard "hooks" in the operating system to monitor the message queues used to communicate commands and/or data sent by other computer programs (referred to as "applications" herein) to and from other entities, such as the graphical user interface (GUI) component provided by the operating system, hardware devices, or other computers. Keeping track of the messages traversing these message queues, by application, provides the basis for measuring an application's end-to-end response time.

The message queues are monitored for certain message types to initiate, update, and/or end a measured end-to-end response time between a user interaction with the client 100, an operation performed by an application, and the resulting display of data on the monitor 104 of the client 100. Such message types may include messages that indicate mouse movements, pressing mouse 106 buttons, keyboard 108 operations, window creations, window "painting", or other device functions.

For example, message types relating to mouse 106 clicks, depressing the ENTER key, window creation in the GUI, and other window or device events in the GUI may be used to initiate or start the monitoring function. Similarly, message types relating to mouse 106 clicks, window "painting" or updates in the GUI, window destruction in the GUI, and other window events in the GUI may be used to update or end the monitoring function. The resulting measured end-to-end response time between these events comprises performance data that may be dynamically displayed for the user (e.g., as timing measurements are initiated or updated) and/or stored for later reporting and analysis.

In the preferred embodiment of the present invention, the operating system provides the ability for the monitor program to examine the content of messages on a given message queue. This interface is provided through an Application Program Interface (API) provided by the operating system. To compute an application's end-to-end response time, the monitor program issues the appropriate API call and registers itself as a listener of all messages in a queue. Thereafter, any messages that traverse the queue are also presented to the monitor program.

When the monitor program receives notification of an inbound message to the application (usually generated as a result of a mouse 106, keyboard 108, window event, or other device event), the monitor program samples the value of a clock to mark the beginning of a transaction. Thereafter, the application also receives the inbound message and begins its processing. When processing by the application is complete, an outbound message is generated from the application. When the monitor program receives notification of the outbound message from the application, the monitor program again samples the value of a clock to mark the ending of the transaction. The difference between the sampled time values associated with the inbound and outbound messages is the end-to-end response time for the application.

However, an application can and frequently does generate multiple outbound messages as part of its processing. Moreover, between these outbound messages, the application can continue to perform its processing associated with a transaction. Because of this, it becomes hard to determine the true end of the application's processing, which is needed to accurately measure the end-to-end response time. So, in order to be sure the monitor program has captured the entire processing time of the transaction, the end-to-end response time is always reported as the difference in time between receipt of the inbound message and the last outbound message generated by the application. If multiple outbound messages are generated before another inbound message is received, then the end-to-end response time is updated multiple times to reflect the difference in time between the inbound message and the last-received outbound message.

Software Components

Figure 2:
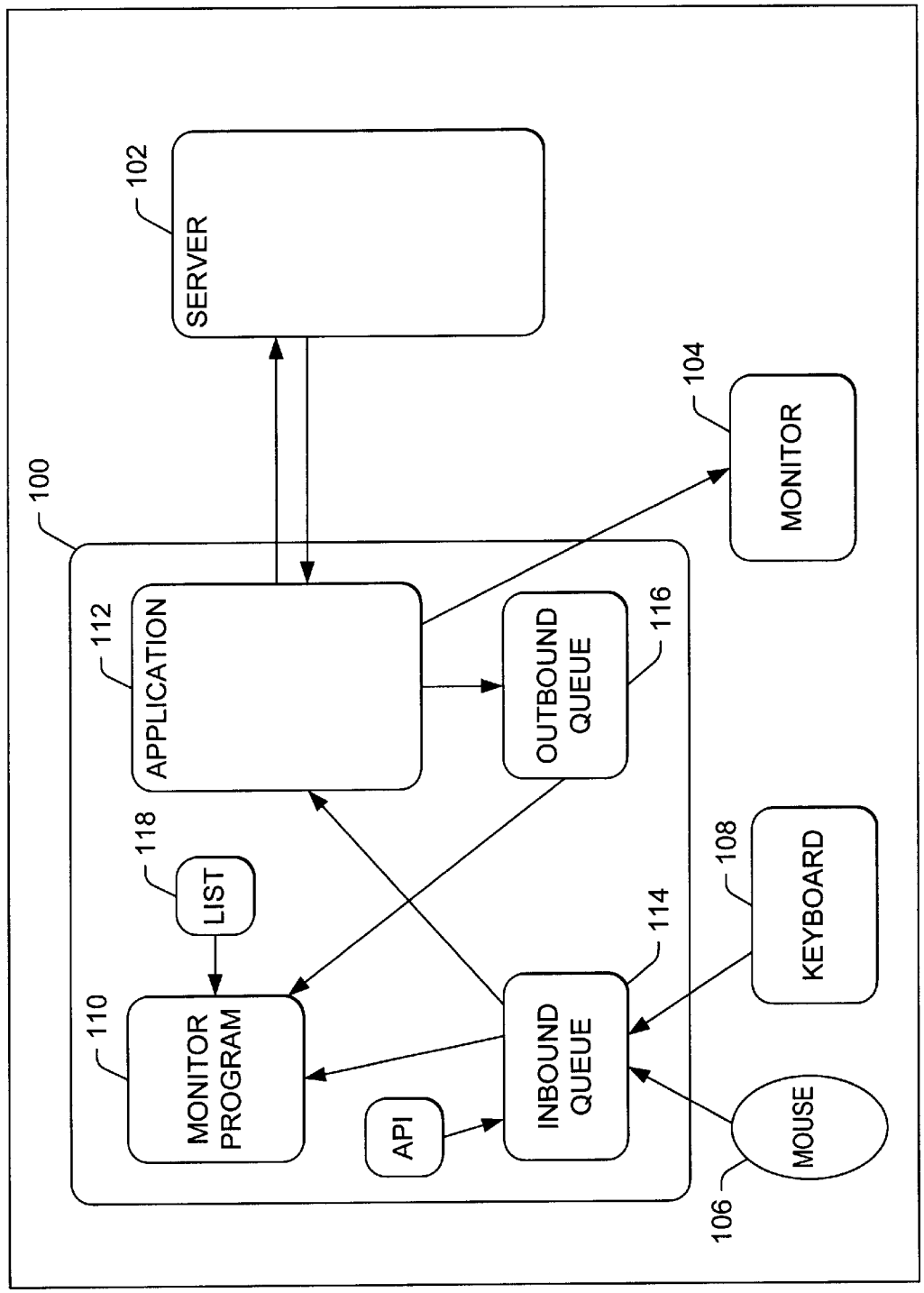
FIG. 2 is a block diagram that illustrates the various software components of the present invention.

FIG. 2 is a block diagram that illustrates the various software components of the present invention. The client 100 includes a monitor program 110, application 112, inbound message queue 114, and outbound message queue 116. Although only one application 112 is shown in FIG. 2, many applications 112 could be running simultaneously and the monitor program 110 would collect data for each independently. Further, there may be multiple queues 114 and 116 that can be monitored.

The monitor program 110 registers its interest in seeing messages on the inbound message queue 114 and outbound message queue 116 by issuing an API call to the operating system (called WinSetHook in OS/2 and similarly named in Windows NT). The API call provides for the creation of "clones" of messages and the transmission of these clones to computer programs registered with the operating system. Once this API call is made, the monitor program 110 is ready to receive all messages sent to and from the application 112.

User input via the mouse 106 or keyboard 108 initiates a request (also called a transaction) for information that causes the operating system to create an inbound message that is sent to the inbound message queue 114. Similarly, the operating system itself can also generate inbound messages in response to "window" or other device events, that are also sent to the inbound message queue 114. Once a message arrives at inbound message queue 114, it is "cloned" and sent to the monitor program 110 before being sent to the application 112.

To start the monitoring function, the monitor program 110 takes note of the inbound message, such as a mouse 106 or keyboard 108 or "window event" message, by sampling the current time value of a clock function provided by the client 100 and labeling this as the "start time" for the transaction. The application 112 then processes the inbound message, which may, for example, result in the generation of a request to the server 102, which is also transmitted as a message through the outbound message queue 116. The server 102 processes the request and then returns the results back to the application 112 as a message via the inbound message queue 114. When the processing by the application 112 is completed, it generates an outbound message, such as a "window paint" message, which is sent to the outbound message queue 116.

The monitor program 110 receives a "clone" of each outbound message, because it is registered to see messages on outbound message queue 116. The monitor program 110 takes note of the outbound "window paint" message by again sampling the current time value of the clock function provided by the client 100 and labeling this as the "end time" for the transaction. The time difference between the "end time" and the "start time" comprises the measured end-to-end response time for the entire transaction (which may include the interaction between the client 100 and server 102 as illustrated above).

Depending on how the application 112 is constructed, it may still continue to process data after the first outbound "window paint" message is sent to outbound message queue 116. The monitor program 110 continues to monitor for outbound "window paint" messages from application 112 sent to the outbound message queue 116 and updates the end-to-end response time accordingly. More specifically, upon notification of subsequent outbound "window paint" messages, before receipt of another inbound mouse 106 or keyboard 108 or window event message, the monitor program 110 updates the response time using the sampled time associated with the last outbound "window paint" message as the "end time" of the transaction.

In addition to monitoring end-to-end response time for a specific application 112, the monitor program 110 can also monitor end-to-end response times for client-server requests (as described above) or for multiple windows associated with a specific application. For example, if the application 112 includes multiple windows, the monitor program 110 can identify the name (i.e., title) given each window and their associated inbound and outbound mouse or keyboard or window event messages.

Detailed Control Flow and Message Recording Method

In the preferred embodiment, the response time information obtained by the present invention is stored in a double linked, circular list 118, although other data structures may be used as well. When all the list 118 entries are used up, the list 118 will "wrap" or start to re-use oldest list 118 entries first. In addition, the list 118 may be written to a data storage device, so no loss of information occurs.

The analysis and reporting of response time measurements goes through three basic conversation points: initiate, update and terminate. These conversation points use different messages and message queues to obtain the information. A discussion of these conversation points follows.

For example, a response time measurement of an application that interacts with the GUI component of the operating system may be initiated by monitoring the inbound message queue for one of the following message types:

Window Create

Mouse Button 1 Down

Enter Key

Button Activation

As a message is examined, its process id (pid), thread id (tid), message queue handle (msgq) and session id (sessid) are determined through standard API functions provided by the operating system. If the message is one of the above, the list 118 is searched backwards to find an active list 118 entry with the corresponding pid, tid and msgq. An active entry is defined as a list 118 entry that has been initiated but not yet marked closed.

If an active entry is found with a matching pid, tid and msgq, and the message is a "window create" message, the window handle is saved if the sessid indicates that it is a title-bar window. This will be used later to determine the title of the window or the transaction name. Next, the message is discarded and a return to the operating system is executed. If an active entry is found with a matching pid, tid and msgq, and the message is not a "window create" message, the list 118 entry is marked closed and no new timings are reported for that list 118 entry. At this point, a new list 118 entry is initiated. The executable file name of the application 112 and the time are determined and stored away in the list 118 entry along with the pid, tid and msgq.

Similarly, a response time measurement of an application that interacts with the GUI component of the operating system may be updated by monitoring the outbound message queue 116 for message types:

Window Paint

If the message being examined on the outbound message queue is a "window paint" message, the list 118 is searched for an active entry with a matching pid, tid and msgq. When found, the current time value is obtained and subtracted from the time value the transaction started. Next, the text is queried from the title bar window handle to get the name of the transaction. Thereafter, the transaction's executable file name, pid, tid, start time, current elapsed time, and transaction name may be displayed by the monitor program 110.

An application 112 may receive any number of "window paint" messages during the course of a transaction. The present invention provides a dynamic update mechanism that automatically reports the information each time a "window paint" message is encountered for a given active application 112. Also note that the present invention will report on any number of active applications 112 that may or may not be executing simultaneously.

Finally, a response time measurement of an application that interacts with the GUI component of the operating system may be terminated or closed by monitoring the inbound message queue 114 for one of the following message types:

Mouse Button 1 Down

Mouse Button 2 Down

When either of the above messages are encountered on the inbound message queue 114, the list 118 is searched for a matching pid, tid and msgq. If found, the entry is marked closed and no new timings will be reported for that list 118 entry. This mechanism must be used to close the transaction since in a message-driven GUI environment, there is no message that indicates that the transaction has finished updating or painting the window displayed by the GUI component of the operating system.

When the list 118 entry is marked closed, the last reported timing from an update or "window paint" message is not altered, so the true transaction response time is not affected by this user interaction. If the user triggered a Mouse Button 1 Down, then in some cases this will be seen on the outbound message queue 116 and a new response time measurement will be initiated for the window or application 112 in focus. If the user triggered a Mouse Button 2 Down, then no new response time measurement will be initiated.

In addition to the scenario described above, client/server applications, such as the Netscape web browser, can be monitored to provide a means of "bracketing" transactions in a more automated fashion, particularly when the application's response time measurement is started and stopped.

In this situation, the enabling and disabling of the Stop button window displayed by the Netscape web browser may serve as the transaction initiation and termination identifiers, respectively. This allows the user to discern the difference between the retrieval of information from the Internet (this is the true response time) and the display of the information, once downloaded from the Internet, on the monitor 104, which may continue indefinitely for some web sites.

The response time measurement is initiated by monitoring the outbound message queue 116 for the Stop button window id and the Window Enable message. When the above situation is encountered, a new list 118 entry is initiated as described above. In addition, message traffic between the Netscape web browser and the server 102 may also be monitored.

The updating of the transaction response time for the Netscape web browser is the same as the generic update method described above. The response time measurement is terminated by monitoring the outbound message queue 116 for the Stop button window id and the Window Disable message. When the above situation is encountered, the list 118 entries are searched for an active matching pid, tid and msgq. When found, a final time value is recorded and the response time is updated with this last time delta, thereby providing the true response time of the targeted web site.

The list 118 entry is then marked closed and Netscape message traffic recording is disabled.

Logic

Figure 3:
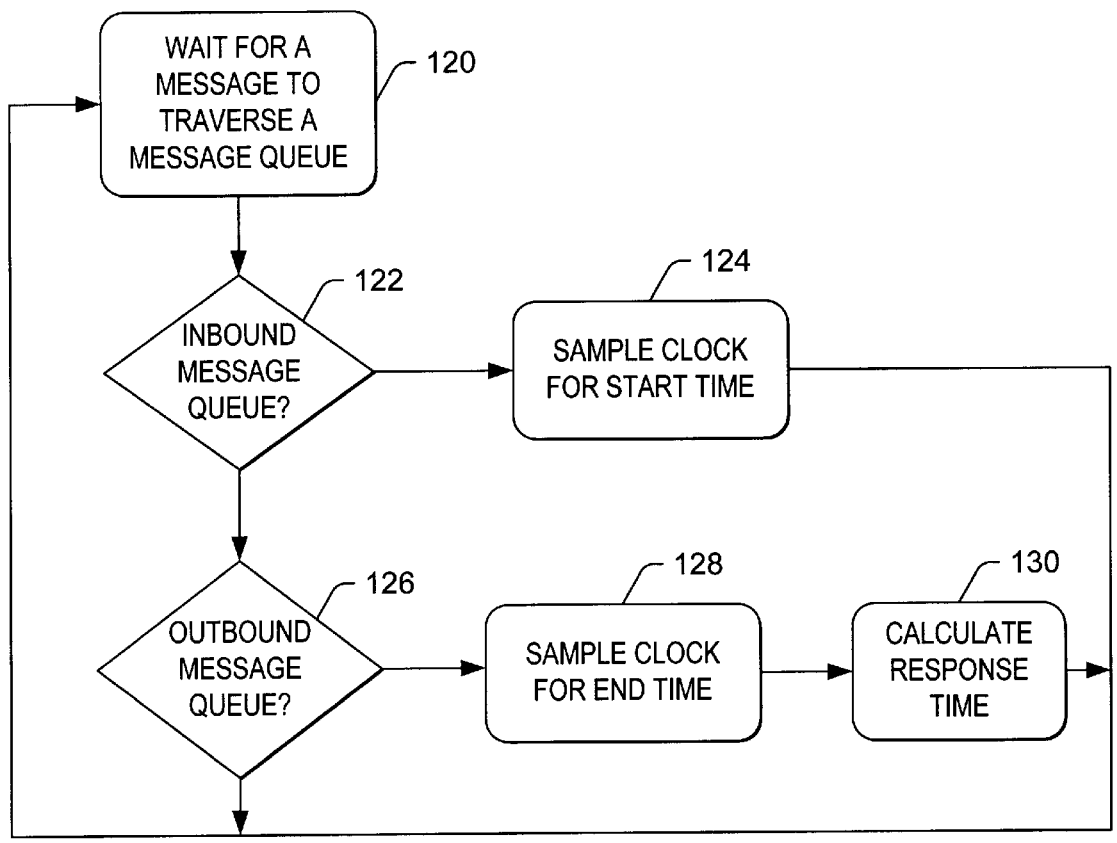
FIG. 3 is a flow chart illustrating the steps used in the present invention.

FIG. 3 is a flow chart illustrating the logic of the present invention. Block 120 represents the monitor program 110 waiting for a message to traverse either the inbound or outbound message queue. Block 122 is a decision block that represents the monitor program 110 determining whether the message traversed the inbound message queue. If so, control transfers to Block 124 which represents the monitor program 110 sampling a time value from a clock for the start time. Thereafter, control transfers back to Block 120. Block 126 is a decision block that represents the monitor program 110 determining whether the message is traversing the outbound message queue. If so, control transfers to Block 128 which represents the monitor program sampling a time value from the clock for the in time and Block 130 which represents the monitor program 110 calculating the response time. Thereafter, control transfers back to Block 120.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for measuring end-to-end response time for a transaction performed by a computer, comprising the steps of:

monitoring a start queue and an end queue in a computer;

assigning a start time when a first message is received at the start queue;

assigning a stop time when a second message, sent when the first message is received at the start queue, is received at the end queue; and calculating an end-to-end response time from the start time and the stop time.

2. The method of claim 1, further comprising the steps of:

updating the stop time when a third message, sent in response to the first message, is received at the end queue; and subtracting the start time from the stop time to calculate the end-to-end response time.

3. The method of claim 1, wherein the end-to-end response time is calculated for a plurality of computer programs executed by the computer.

4. The method of claim 1, wherein the end-to-end response time is calculated for a plurality of windows displayed by a computer program executed by the computer.

5. The method of claim 1, wherein the second message is selected from a group comprising a window create message, a mouse button 1 down message, an enter key message, and a button activation message.

6. The method of claim 1, wherein the first message is a window paint message.

7. A computerized apparatus for measuring end-to-end response time for a transaction performed by a computer, comprising:

a start queue and an end queue in a computer;

a start time, assigned to a first message when the first message is received at the start queue; and a stop time, assigned to a second message when the second message, sent in response to the first message, is received at the end queue, where an end-to-end response time is calculated by subtracting the start time from the stop time.

8. The computerized apparatus of claim 7, further comprising:

a third message, sent in response to the first message, received at the end queue and receiving a second stop time; where the end-to-end response time is calculated by subtracting the second stop time from the start time.

9. The computerized apparatus of claim 7, wherein the end-to-end response time is calculated for a plurality of computer programs executed by the computer.

10. The computerized apparatus of claim 7, wherein the end-to-end response time is calculated for a plurality of windows displayed by a computer program executed by the computer.

11. The computerized apparatus of claim 7, wherein the second message is selected from a group comprising a window create message, a mouse button 1 down message, an enter key message, and a button activation message.

12. The computerized apparatus of claim 7, wherein the first message is a window paint message.

13. An article of manufacture comprising a program storage medium readable by a computer having a memory, the medium tangibly embodying one or more programs of instructions executable by the computer to perform method steps for measuring end-to-end response time for a transaction performed by the computer, the method comprising the steps of: monitoring a start queue and an end queue in a computer;

assigning a start time when a first message is received at the start queue;

assigning a stop time when a second message, sent when the first message is received at the start queue, is received at the end queue; and calculating an end-to-end response time from the start time and the stop time.

14. The method of claim 13, further comprising the steps of:

updating the stop time when a third message, sent in response to the first message, is received at the end queue; and subtracting the start time from the stop time to calculate the end-to-end response time.

15. The method of claim 13, wherein the end-to-end response time is calculated for a plurality of computer programs executed by the computer.

16. The method of claim 13, wherein the end-to-end response time is calculated for a plurality of windows displayed by a computer program executed by the computer.

17. The method of claim 13, wherein the second message is selected from a group comprising a window create message, a mouse button 1 down message, an enter key message, and a button activation message.

18. The method of claim 13, wherein the first message is a window paint message.

* * * * *

UNITED STATES PATENT AND TRADEMARK OFFICE
CERTIFICATE OF CORRECTION

PATENT NO.    : 6,202,036 B1
DATED         : March 13, 2001
INVENTOR(S)   : Paul F. Klein and Raymond P. Ammerman, III It is certified that error appears in the above-identified patent and that said Letters Patent is hereby corrected as shown below:

<u>Title page,</u>
Item [57], ABSTRACT,
Line 1, "An end-to-end response time measurement method monitors the performance of a computer program by measuring the time between related messages that traverse inbound and outbound message queues." should read -- A method, apparatus, and article of manufacture for measuring end-to-end response time for a transaction performed by a computer is disclosed. The method comprises the steps of monitoring a start queue and an end queue in a computer, assigning a start time when a first message is received at the start queue, assigning a stop time when a second message, sent in response to the first message, is received at the end queue, and subtracting the start time from the stop time to calculate an end-to-end response time. --

Signed and Sealed this

Twenty-sixth Day of November, 2002

Attest:

Attesting Officer

JAMES E. ROGAN
*Director of the United States Patent and Trademark Office*